US010095210B2

(12) United States Patent
Caley et al.

(10) Patent No.: US 10,095,210 B2
(45) Date of Patent: Oct. 9, 2018

(54) DEVICE PROGRAMMING SYSTEM WITH MULTIPLE-DEVICE INTERFACE AND METHOD OF OPERATION THEREOF

(71) Applicant: Data I/O Corporation, Redmond, WA (US)

(72) Inventors: Andrew B. Caley, Bellevue, WA (US); Derek P. Steffey, Sequim, WA (US)

(73) Assignee: Data I/O Corporation, Redmond, WA (US)

( * ) Notice: Subject to any disclaimer, the term of this patent is extended or adjusted under 35 U.S.C. 154(b) by 286 days.

(21) Appl. No.: 15/061,939

(22) Filed: Mar. 4, 2016

(65) Prior Publication Data

US 2016/0259312 A1 Sep. 8, 2016

Related U.S. Application Data

(60) Provisional application No. 62/129,758, filed on Mar. 6, 2015.

(51) Int. Cl.
*G05B 19/05* (2006.01)
*G05B 19/042* (2006.01)
*G05B 15/02* (2006.01)
*G06F 8/61* (2018.01)

(52) U.S. Cl.
CPC ......... *G05B 19/0426* (2013.01); *G05B 15/02* (2013.01); *G06F 8/63* (2013.01); *G05B 19/05* (2013.01)

(58) Field of Classification Search
CPC ........ G05B 19/0426; G05B 15/02; G06F 8/63

USPC .......................................................... 700/86
See application file for complete search history.

(56) References Cited

U.S. PATENT DOCUMENTS

| | | | |
|---|---|---|---|
| 5,680,061 A | 10/1997 | Veenstra et al. | |
| 5,943,260 A | 8/1999 | Hirakawa | |
| 7,057,397 B1 * | 6/2006 | Davidson | G01R 31/31715 324/606 |
| 7,360,137 B2 | 4/2008 | Amidon et al. | |
| 7,966,622 B1 * | 6/2011 | Purser | G06F 9/4411 719/321 |
| 8,286,125 B2 | 10/2012 | McDonald et al. | |
| 8,539,398 B2 | 9/2013 | McDonald et al. | |
| 8,863,072 B1 * | 10/2014 | Jahnke | G06F 17/5054 716/116 |
| 8,924,907 B1 * | 12/2014 | Jahnke | G06F 17/504 716/116 |
| 2004/0117755 A1 * | 6/2004 | Blodget | G06F 15/7867 716/117 |
| 2006/0224821 A1 | 10/2006 | Chen et al. | |
| 2007/0255874 A1 * | 11/2007 | Jennings | G06F 13/1642 710/113 |
| 2007/0258298 A1 | 11/2007 | Amidon et al. | |
| 2016/0110940 A1 * | 4/2016 | Huang | G07D 7/2008 382/137 |

* cited by examiner

*Primary Examiner* — Ly D Pham
(74) *Attorney, Agent, or Firm* — Wong & Rees LLP (57) ABSTRACT

A device programming system, and a method of operation thereof, includes: a field programmable gate array unit configured using a programming driver retrieved based on a device type of a first programmable device; and a second programmable device and the first programmable device configured simultaneously using a master image and the field programmable gate array unit.

10 Claims, 5 Drawing Sheets

DEVICE PROGRAMMING SYSTEM WITH MULTIPLE-DEVICE INTERFACE AND METHOD OF OPERATION THEREOF

CROSS-REFERENCE TO RELATED APPLICATION(S)

This application claims the benefit of U.S. Provisional Patent Application Ser. No. 62/129,758 filed Mar. 6, 2015, and the subject matter thereof is incorporated herein by reference thereto.

TECHNICAL FIELD

The present invention relates generally to a programming system, and more particularly to a system for programming devices.

BACKGROUND ART

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

For example, programmable devices such as Flash memories (Flash), electrically erasable programmable read only memories (EEPROM), programmable logic devices (PLDs), field programmable gate arrays (FPGAs), and microcontrollers incorporating non-volatile memory elements, can be configured with separate programming equipment, which is often located in a separate area from the circuit board assembly lines.

There is a need for a system and system sub-assemblies that enable just-in time programming of multiple micro devices. In another example, tape-on-reel lines rely on carrier tapes with micro devices such as programmable memory devices that have been pre-programmed and placed at uniform distances on the tape. The micro devices on the tape can be delivered to a manufacturing system.

Thus, a need still remains for a system and system sub-assemblies that enable just-in time programming of multiple programmable devices within a manufacturing line. In view of lack of operational efficiency in programming and packaging of programmable devices, it is increasingly critical that answers be found to these problems. In view of the ever-increasing commercial competitive pressures, along with growing consumer expectations, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of a device programming system including: receiving a master image; detecting a device type of a first programmable device; retrieving a programming driver based on the device type; configuring a field programmable gate array unit using the programming driver; and configuring the first programmable device and a second programmable device simultaneously using the master image and the field programmable gate array unit.

The embodiments of the present invention provide a device programming system, including: a field programmable gate array unit configured using a programming driver retrieved based on a device type of a first programmable device; and a second programmable device and the first programmable device configured simultaneously using a master image and the field programmable gate array unit.

Certain embodiments of the invention have other steps or elements in addition to or in place of those mentioned above. The steps or the elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the embodiments of the present invention.

In the following description, numerous specific details are given to provide a thorough understanding of the invention. However, it will be apparent that the invention may be practiced without these specific details. In order to avoid obscuring the embodiments of the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The term "module" referred to herein can include software, hardware, or a combination thereof in the embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Where multiple embodiments are disclosed and described having some features in common, for clarity and ease of illustration, description, and comprehension thereof, similar and like features one to another will ordinarily be described with similar reference numerals. The embodiments have been numbered second embodiment, first embodiment, etc. as a matter of descriptive convenience and are not intended to have any other significance or provide limitations for the embodiments of the present invention.

Figure 1:
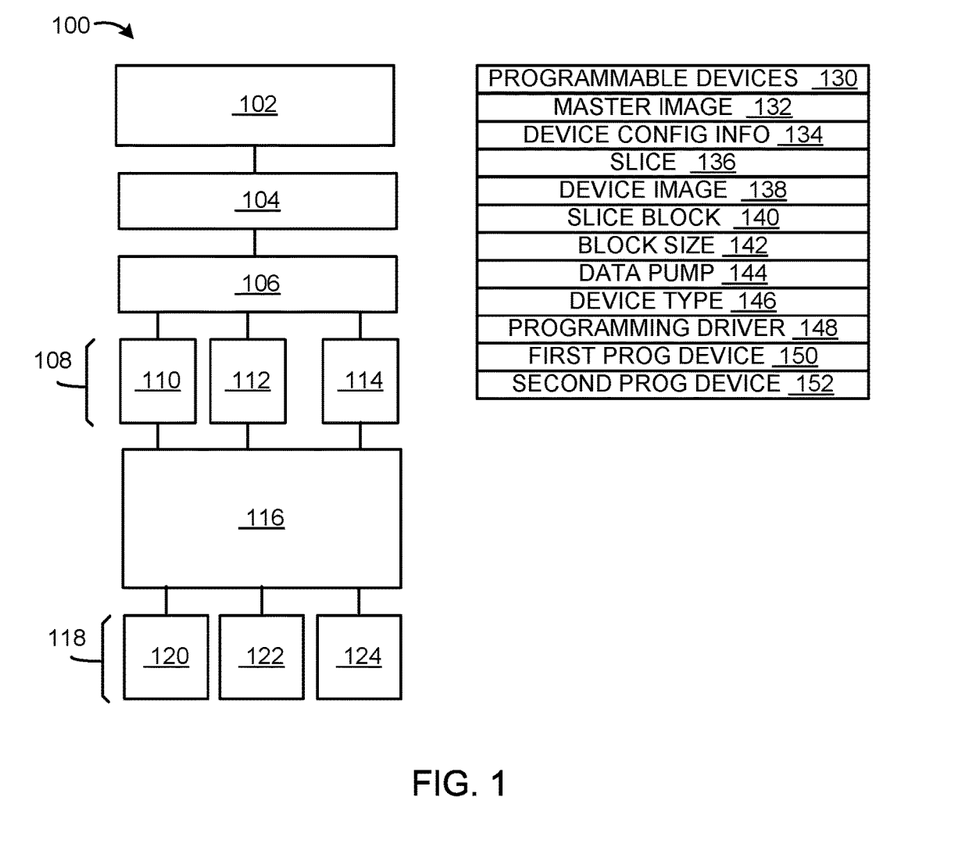
FIG. 1 is a block diagram of a device programming system in an embodiment of the present invention.

Referring now to FIG. 1, therein is shown a block diagram of a device programming system 100 in an embodiment of the present invention. The device programming system 100 can include a parallelism agnostic, high-performance algorithm implementation for programming multiple programmable devices 130 simultaneously. Simultaneously means occurring at an overlapping time period. In particular, programming the programmable devices 130 simultaneously means that two or more devices are being programmed during a single time period. The programming time of each device may be of different length or offset from one another, but during at least one time period, two or more of the devices are being programmed.

The device programming system 100 can detect the number of hardware programmer units coupled to the system and configure the programmable devices 130 on each of the programmer units simultaneously. The device programming system 100 can include a host interface 102, an agnostic algorithm module 104, a system management firmware 106, a set of algorithm programming modules 108, a programmer station 116, and a set of device interfaces 118.

The device programming system 100 can include the host interface 102. The host interface 102 is a module for controlling the device programming system 100. For example, the host interface 102 can be a user interface to allow a user to configure and manage the device programming system. Configuring is setting system level parameters that control the operation of the device programming system.

The host interface 102 can be coupled to the agnostic algorithm module 104. The agnostic algorithm module 104 is a computer module for distributing a master image 132 for the programmable devices 130 to one or more device interfaces 118, such as a first device interface 120, a second device interface 122, and a nth device interface 124. The master image 132 can be partitioned into slices 136. Each of the slices 136

The device interfaces 118 are devices for configuring the programmable devices 130. Each of the device interfaces 118 can use device configuration information 134 to program a device image 138 into each of the programmable devices 130.

The agnostic algorithm module 104 can create the device image 138 having the data and device configuration information for configuring the programmable devices 130. The data can include the information to be programmed into the programmable devices 130. The device configuration information can provide hardware-specific information about the device interfaces 118 to allow the programming of the data into the programmable devices 130. The device image 138 is partially formed from the master image 132.

The agnostic algorithm module 104 can be coupled to the system management firmware 106. The system management firmware 106 is code to control the device programming system 100. For example, the system management firmware 106 can include code for customizing the programmable devices 130, code for managing the programmer station 116, code for performing housekeeping functions, and other similar tasks. The system management firmware 106 can instantiate and manage the processing threads for each of the algorithm programming modules 108. Each of the algorithm programming modules 108 can receive portions of the master image 132 known as slices 136.

The algorithm programming modules 108, such as a first algorithm module 110, a second algorithm module 112, and an nth algorithm module 114, can each run in independent parallel processing threads 115. Each of the processing threads 115 is a computational entity capable of executing code. Although the term thread is used, the processing threads 115 can be processes, threads, lightweight processes, subroutines, objects, instances, or a combination thereof. The processing threads 115 can execute in an independent and parallel manner.

In an illustrative example, each of the algorithm programming modules 108 can be configured differently to program different device types simultaneously. The device programming system 100 can provide inter-process synchronization mechanisms to coordinate the activities of the algorithm programming modules 108. In another illustrative example, the algorithm programming modules 108 can be configured to program different areas on the programmable devices 130, such as a memory area and a logic area.

The algorithm programming modules 108 are individual processes for controlling the device interfaces 118 to configure the programmable devices 130. Each of the algorithm programming modules 108 can control a one or more of the device interfaces 118. Each of the algorithm programming modules 108 can operate independently and receives the device image 138 used for programming the programmable devices 130 connected to one of the device interfaces 118.

For example, in a configuration where the device programming system 100 include "n" device interfaces, the system can include a first algorithm module 110 coupled to a first device interface 120, a second algorithm module 112 coupled to the second device interface 122, and the nth algorithm module 114 coupled to the nth device interface 124. Although a one to one mapping is described, the device programming system 100 can include other configurations including those where more than one of the device interfaces 118 is coupled to a single one of the algorithm programming modules 108.

The programmer station 116 is a device for controlling the device interfaces 118 to configure the programmable devices 130. For example, the programmer station 116 can include a robotic arm system for loading the programmable devices 130 into one or more hardware programmer device interfaces for programming. In another example, the programmer station 116 can be multiple unit adapter system for programming more than one of the programmable units at a time. In general, the programmer station 116 is the hardware unit connected to the device interfaces 118 to drive the device programming process.

The device interfaces 118 are the devices for physically coupling to the programmable devices 130 to configure the programmable devices 130 using the device image 138. The device interfaces 118 can be the end programming units having the sockets and adapters to mount the programmable devices 130. The device interfaces 118 can configure the programmable devices using the pin and connector level information to transfer the data from the device image 138.

The agnostic algorithm module 104 can implement the application-specific interface between the hardware programmer modules and the programmable devices 130, such as a non-volatile memory (NVM), field programmable gate array (FPGA), configurable processor, hybrid device, or a combination thereof.

When multiple devices are being programmed simultaneously, each of the device interfaces 118 can be driven in parallel to program one or more of the programmable devices 130. Each of the algorithm programming modules 108 is coupled through the programmer station 116 to one of the device interfaces 118. For example, the device interfaces 118 can be programming units with sockets, programming units with a pick-and-place robotic arm, a single socket programming unit, or a combination thereof. The combination of the algorithm programming modules 108, the programmer station 116, and the device interfaces 118. Typically, most architecture can use a common data-source to transmit identical data to all interfaces in parallel or gang programming.

The agnostic algorithm module 104 can be responsible for synchronizing the device-specific protocol between the programmer hardware and the programmable devices 130 and may serialize certain portions of its operation as required. In a monolithic algorithm, the algorithm can be responsible to manage and synchronize all parallel interfaces itself.

In an illustrative example, the agnostic algorithm module is implemented that is initially unaware of how many of the device interfaces 118 are present or supported on the device programming system 100. In this case, the agnostic algorithm module 104 can use an abstracted interface to implement the necessary protocol information for a single one of the programmable devices. At run-time, the system firmware instantiates multiple instances of the algorithm programming modules 108, and each executes as an independent thread or process. The system management firmware 106 is responsible for implementing synchronization between the algorithm instances.

The device programming system 100 can include the system management firmware 106. Any hardware resources utilized by the algorithm are accessed via an application programming interface (API) in the system management firmware 106 that enforces separation of functionality so that one thread cannot interfere with the functional operation of another thread. Any serialized operations that are employed may be accomplished via pre-amble or post-amble API's in the system management firmware 106.

Each of the algorithm programming modules 108 can communicate with others of the algorithm programming modules 108. The global synchronization of each of the algorithm programming modules 108 can be accomplished via a data-delivery process. The agnostic algorithm can receive data from the system, and operate on that piece of data in a sequential independent manner. This process is compatible with the Broadcast Architecture model. Each of the algorithm programming modules 108 can execute in a separate processing thread.

A data pump 144 mechanism may be used to provide identical programming data to each algorithm thread and each thread can wait when it is done processing until the next block is sent. The data pump 144 is a mechanism for distributing data to the programmer station and the device interfaces 118. The data pump 144 can be implemented in a variety of ways. The data pump 144 can be a single high-speed data distribution channel, a parallel data distribution channel, or a combination thereof The data pump 144 can distribute the data in a slice block 140. The slice block 140 is a portion of the master image 132. The slice block 140 can have a block size 142. The granularity of the block size 142 can be optimized for the system and buffered for high-performance.

The device programming system 100 can include customized parameters, such as timing parameters, voltage levels, and command and timing parameters. The customized parameters can be used for each device type 146 of the programmable devices 130 or DUT to receive the bulk programming data. The device type 146 is an identifier describing the programmable devices 130 coupled to the device interfaces 118.

The agnostic algorithm module 104 can detect the device type 144 and retrieve a programming driver 148 for configuring the programmable devices 130 having the device type 146. The programming driver 148 can include the information needed to electrically modify the programmable devices 130. For example, the programming driver 148 can include information about the pin layout of the programmable devices 130 for the device type 146. The programming driver 148 can be used by the algorithm programming modules 108 to configure the programmable devices 130.

The programming driver 148 can be different for each of the algorithm programming module 108. For example, the programming driver 148 can include a first programming driver, a second programming driver, and a nth programming driver. Each different one of the device type 146 can have a separate one of the programming driver 148 customized for that device type 146.

In an illustrative example, a first programmable device 150 can have a first device type. A second programmable device 152 can have a second device type 156. The first programmable device 150 and the second programmable device 152 can be configured simultaneously using the slices 136 of the master image 132.

It has been discovered that parallelism agnostic algorithms provide the benefits of having less development time because an algorithm writer does not need to have responsibility for the system firmware. The development time is less because each of the algorithms only needs to know the device specific instructions for only one type of the non-volatile memory devices.

It has been discovered that the algorithms' portability is improved because the algorithms have a less concrete implementation, compared with monolithic algorithms that encompass both the system firmware and the algorithm.

It has further been discovered that the parallelism agnostic algorithms are provided to work with any hardware platform with any non-volatile memory devices in the device programming system having multiple management layers for multiple types of the non-volatile memory devices, whereby each of the management layers is for a different type of the non-volatile memory devices.

Figure 2:
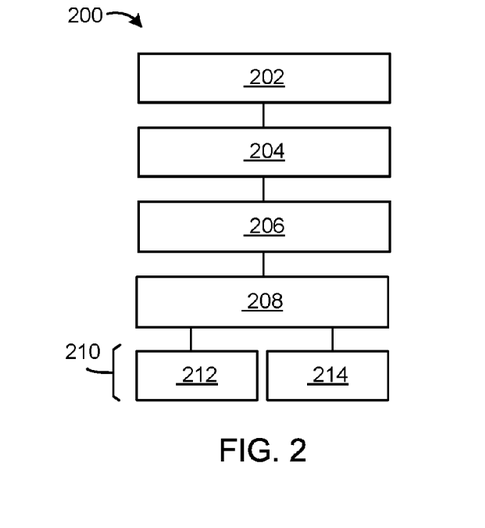
FIG. 2 is a second example of the system diagram of a device programming system.

Referring now to FIG. 2, therein is shown a second example of the system diagram of a device programming system 200. The device programming system 200 can configure the programmable devices 130 of FIG. 1 in a monolithic process. The device programming system 200 can include a host interface 202, an algorithm module 204, a system management firmware 206, a programmer hardware module 208, and device interfaces 210, such as a first device interface 212 and a second device interface 214. The functional units of the device programming system 200 correspond to the similarly designated units of the device programming system 100.

Figure 3:
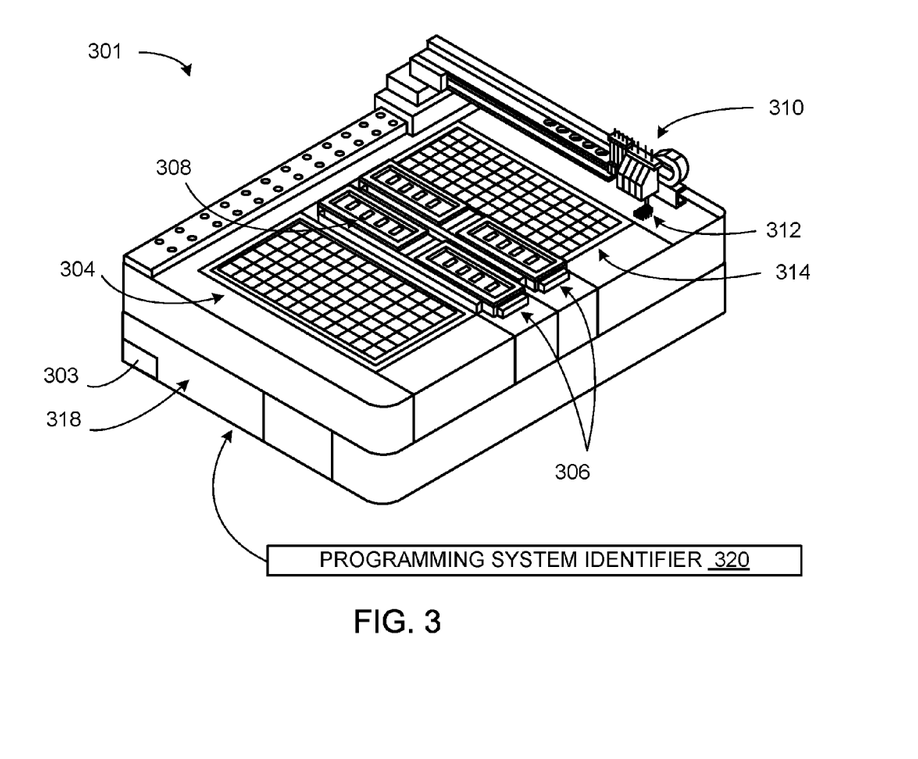
FIG. 3 is an isometric view of a device programmer.

Referring now to FIG. 3, therein is shown an isometric view of a device programmer 301. The device programmer 301 can include a programming processor 318, an input device receptacle 304, socket adapters 306, destination sockets 308, a device placement unit 310, programmable devices 130, and an output device receptacle 314.

The device programmer 301 is a device for configuring the programmable devices 130. The device programmer 301 can load an entire chip image at a time and then configure the programmable devices 130. Configuring is defined as writing control and data information to the programmable devices 130. Configuring the programmable devices 130 can store memory structure and user data on the programmable devices 130. Configuring can include forming one-time structures such as partitions on the programmable devices 130.

The device programmer 301 can include the programming processor 318. The programming processor 318 is a computing unit for controlling the device programmer 301. The programming processor 318 can include a central processing unit (not shown), a local storage unit 303, a communication interface (not shown), and a software (not shown). The device programmer 301 can be identified with a programming system identifier 320. The programming system identifier 320 is a value for uniquely identifying the system.

The local storage unit 303 is a device for storing and retrieving information. For example, the local storage unit 303 of the device programmer 301 can be a disk drive, a solid-state memory, an optical storage device, or a combination thereof. The software is control information for executing on the control unit. The software can be used to control the functionality of the device programmer 301.

The device programmer 301 can include the input device receptacle 304 and the output device receptacle 314. The input device receptacle 304 is a source of the programmable devices 130. For example, the input device receptacle 304 can be a tray that conforms to the Joint Electron Device Engineering Council (JEDEC) standards. The input device receptacle 304 can be used for holding unprogrammed devices. The output device receptacle 314 is a destination for the programmable devices 130 that have been processed. For example, the output device receptacle 314 can be an empty JEDEC tray for holding finished devices.

The device programmer 301 can include the socket adapters 306 having the destination sockets 308. The socket adapters 306 are mechanisms for holding and managing sockets. The sockets are mechanisms for holding and interfacing with the programmable devices 130.

The socket adapters 306 are modular and can be removed from the device programmer 301 to accommodate different socket configurations. For example, the socket adapters 306 can include a latch mechanism (not shown) for attaching to the device programmer 301. The socket adapters 306 are secure devices that can authenticate themselves with the device programmer 301 using a cryptographic challenge process. The socket adapters 306 are described in greater detail below.

The destination sockets 308 can be used to hold the programmable devices 130. In general, the destination sockets 308 can be used to read or write new information to one of the programmable devices 130.

The device programmer 301 can include the device placement unit 310. The device placement unit 310 is a mechanism for positioning a programmable device in one of the destination sockets 308.

The device placement unit 310 can be implemented in a variety of ways. For example, the device placement unit 310 can be a robotic arm, a pick and place mechanism, or a combination thereof. Although the device placement unit 310 is described as a rail-based positioning system, it is understood that any system capable of positioning one of the programmable devices 130 in the destination sockets 308 can be used.

The device placement unit 310 can retrieve one or more of the programmable devices 130 that are blank from the input device receptacle 304. The device placement unit 310 can transport the programmable devices 130 to the destination sockets 308 of the socket adapters 306.

Once the programmable devices 130 are engaged and secured by the socket adapters 306, the device programming process can begin. The device programmer 301 can program a local copy of the information into the programmable devices 130 in one of the destination sockets 308. For example, the local cop of the programming information can be in a pre-programmed master device, from a file in local storage, or from a remote server.

Once programming is complete, the device placement unit 310 can transport the programmable devices 130 that have been programmed to the output device receptacle 314. The device placement unit 310 can transports any of the programmable devices 130 that have errors to a reject bin (not shown).

In an illustrative example, the device programmer 301 can be the programming station 116 of FIG. 1. The socket adapters 306 can be used as the device interfaces 118 of FIG. 1

Figure 4:
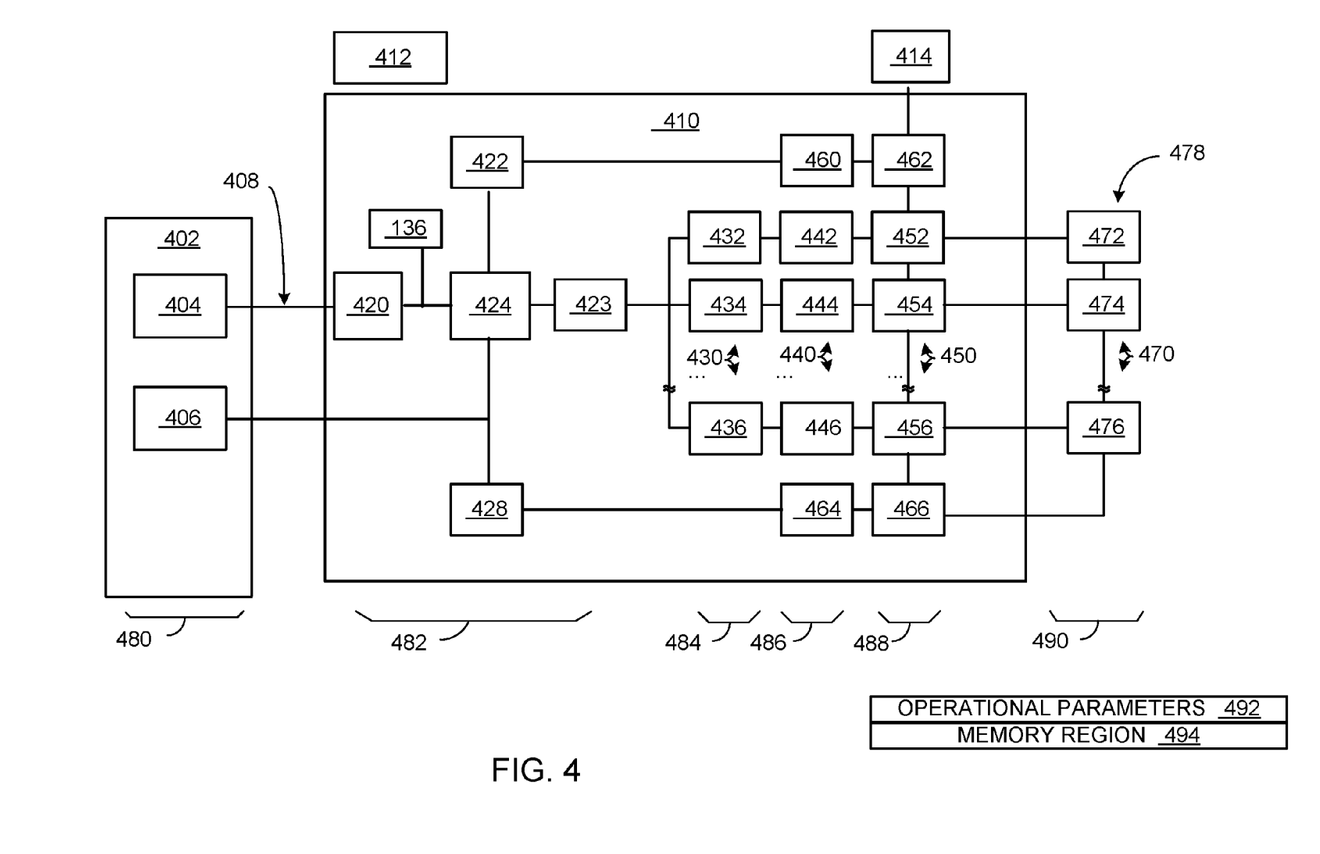
FIG. 4 is a system diagram of the device programming system.

Referring now to FIG. 4, therein is shown a system diagram of the device programming system 100. The system diagram of the device programming system 100 depicts an overview design detail with design layers showing architecture segmentation.

The device programming system 100 can have a variety of configurations. For example, the device programming system 100 can include a host layer 480, a slice management layer 482, a driver layer 484, a field programmable gate array access layer 486, an FPGA physical layer 488, and an electrical layer 490. The electrical layer 490 can include the DUT adapters 470. The DUT adapters 470 can include a first device adapter 472, a second device adapter 474, and a nth device adapter 476.

The host layer 480 can prepare the slices 136 of the master image 132 for transfer to the programmer units. The slice management layer 482 can receive the slices 136 and distribute the slices 136 appropriately. The driver layer 484 can represent the creation of the run-time versions of the algorithm programming modules 108. The FPGA access layer 486 can coordinate the hardware configuration information for manipulating FPGA units 450. The FPGA physical layer 488 can implement the FPGA units 450. The electrical layer 490 can coordinate the transfer of the coded electrical signals used to configure the programmable devices 130.

The device programming system 100 can partition the master image 132 of FIG. 1 into the slices 136 that are distributed to the device interfaces 118 to configure the programmable devices 130, also known as devices under test 478.

The device programming system 100 can include a device processing unit 410 for implementing the computational tasks of the system. The device processing unit 410 is a device for implementing the device programming system 100. The device processing unit 410 can provide computer processing, memory, on-board FPGA devices, communications, power management, security, and other features.

The device processing unit 410 can have a variety of configurations. For example, the device processing unit 410 can be devices such as a Xilinx Zynq-9000 System on a Chip, a Xilinx Zynq-UltraScale+, or other programmable computing devices, or similar programmable device.

The device programming system 100 can include a system storage unit 412. The system storage unit 412 can provide non-volatile storage for the device processing unit 410.

In an illustrative example, the system storage unit 412 can provide an operating system (OS) non-volatile (NV) storage for various operating systems and cross-platform application platforms, such as Linux, Mono, .Net, or a combination thereof. Linux can provide an operating system for the system. Mono, an open source version of the NET framework, can be used as the primary runtime environment.

Using a higher-level managed language allows for simpler development and debugging. Binaries executable images created in Mono can be configured as cross platform applications and can be built and tested locally on developer machines before being transferred to the programmer units for execution. In addition, .NET allows the use of reflection to directly inspect driver code during runtime, which can be used for job creation.

The device programming system can include a programmer memory unit 414. The programmer memory unit 414 is a random access memory for holding copies of the slices 136 and the master image 132. For example, the programmer memory unit 414 can be DDR RAM.

The host layer 480 is for interfacing with the device programming system 100. The host layer 480 can include a host unit 402, a slice producer 404 and a host driver manager 406.

The slice producer 404 is a unit for preparing the slices 136 of the master image 132 for transfer to the programmer units. The slice producer 404 can partition the slices 136 based on the size of the master image and the size of the programmable devices 130.

The host driver manager 406 is a unit for interfacing with the device processing unit 410. The host driver manager 406 can be coupled to the device processing unit 410 via a network connection 408.

The slice management layer 482 is for distributing the slices 136 of the master image 132 and allocating them for processing on the device interfaces 118. The slice management layer 482 can include a slice receiver 420, a driver process manager 424, and a system controller 428.

The slice management layer 482 of the device programming system 100 can include the slice receiver 420 to manage the connection to the host layer 480 and to receive the slices 136 from the host unit 402 over the network. The slice receiver 420 can be coupled to the slice producer 404 of the host layer 480.

The slice management layer 482 can have a variety of configurations. For example, the slice management layer 482 can receive the slices 136 over a network from the host unit 402. In another example, the slice management layer 482 can include a local cache memory system for buffering both a copy of the master image 132 and each of the slices 136 used to program the master image 132 into the programmable devices. In yet another example, the local cache can store just the slices 136 in the device programming system 100.

It has been discovered that caching the master image 132 and the slices 136 in the device programming system 100 reduces the time required to load and distribute the slices 136 into the programmable devices 130. By reducing the time required to transfer the slices 136 over the network, overall efficiency and system performance is increased.

The slice receiver 420 can parse the slices 136 and pass slice metadata 423 and slice data 422 to the driver process manager 424. The slice metadata 423 is the control and status information about the slices 136. The slice data 422 is the information to be programmed into the programmable devices 130.

The driver process manager 424 can create the algorithm programming modules 108 of FIG. 1. The driver process manager 424 can invoke driver processes 430 for each of the programmable devices 130 in the device interfaces 118. The driver processes 430 can include a first driver process 432, a second driver process 434, and a nth driver process 436.

The driver process manager 424 can give the driver processes 430 a handle to a physical control application programming interface 440 (API) for the type of the programmable devices 130 being configured. A physical control API 440 can provide configuration information for programming different types of the programmable devices 130. For example, the physical control API 440 can define the electrical pins for the programmable devices 130, operational voltage levels, signal information, timing, security information, and other configuration information. The physical control API 440 can include a first control API 442, a second control API 444, and a nth control API 446.

The driver process manager 424 can give the driver processes 430 operations to perform and the associated operational parameters to execute. Operational parameters 492 can include a device interface identifier, the slices 136, the block size 142, and other similar parameters.

The driver process manager 424 can provide the address of the slice data 422 to a system data API 460. The system data API 460 can provide data configuration information.

The driver process manager 424 can receive status from the driver processes 430 and the device interfaces via a system control API 464. The system control API 464 can provide control information about the device interfaces 118 and the programmable devices 130.

The driver layer 484 can create and manage the driver processes 430, such as the algorithm programming modules 108. The driver layer 484 can create one of the driver processes 430 for each of the device interfaces 118 having one of the devices under test 478. Each of the driver processes 430 can have access to a single physical control API 440. The overall collection of the operations can be invoked by the driver process manager 424. The driver process manager 424 passes the operational parameters 492 to the driver processes 430.

Each of the driver processes 430 can be instances of the algorithm programming modules 108. Each of the algorithm programming modules 108 can control one of the device interfaces 118 for configuring the programmable devices 130.

The driver layer 484 can have one of the driver processes 430 for each one of the devices under test 478. The driver processes 430 can each implement one of the algorithm programming modules 108 of FIG. 1 for each of the devices under test 478.

The FPGA access layer 486 provides the system with a set of application programming interfaces for controlling access to the slice data, hardware devices, and overall process control. The FPGA access layer can include the system data API 460, a physical control API 440, and the system control API 464.

The FPGA access layer 486 can include the system data API 460 for providing access to the common system data and resources, such as the slice data 422. The system data API 460 can provide a single function which gives the FPGA units 450 access to the current memory address of one of the slices 136. This can improve the performance of the system by providing access to a single copy of each the slices 136 for all of the driver processes 430.

The FPGA access layer 486 can include the physical control API 440. The physical control API 440 can control the configuration of the FPGA units 450 in the device processing unit 410. The FPGA access layer 486 can be provided by the FPGA physical designer. It can map the high level function calls to the individual registers on the FPGA units 450 of the device processing unit 410. Each specific one of the FPGA units 450 can be coupled to a unique physical control API 440. The FPGA units 450 can include a first FPGA unit 452, a second FPGA unit 454, and a nth FPGA unit 456.

The FPGA access layer 486 can use the programming driver 148 of FIG. 1 to configure the FPGA units 450. The programming driver 148 can be retrieved based on the device type 146 of FIG. 1 of the programmable devices 130.

The FPGA access layer 486 can include the system control API 464. The system control API 464 controls system based resources such as the pass fail light emitting diodes (LED), adapter power on/off control, and other similar resources.

The FPGA physical layer 488 can include the hardware resources for controlling the configuration of the programmable devices 130. The FPGA physical layer 488 can include a slice random access memory controller 462 (slice RAM controller), the FPGA units 450, and a FPGA shared control unit 466.

The slice RAM controller 462 can provide access to the system storage unit 412. The system storage unit 412 is a system random access memory area provided to store information. The system storage unit 412 can have a variety of configurations, such as dual data rate random access memory (DDR RAM), dynamic random access memory devices (DRAM), or a combination thereof. For example, the slice RAM controller 462 can provide access to the slice data 422 buffered in the system storage unit 412 for each of the FPGA units 450.

The FPGA physical layer 488 can include the FPGA units 450. The FPGA units 450 are programmable FPGA device areas on the device processing unit 410. The FPGA units 450 can be configured to direct the proper electrical signals to the programmable devices 130 for programming. For example, the FPGA units 450 can be configured with the programming driver 148 to map pins to control signals for configuring the programmable devices 130.

The FPGA physical layer 488 can include a specific physical control API 440. The physical control API 440 can be responsible for receiving instruction from the driver layer 484 via the physical control API 440. It can also generate the correct waveforms to interact with the target devices. For example, the FPGA units 450 can have approximately 16 kilobytes (KB) of block random access memory to cache data to ensure consistent timings are generated for full pages.

Each of the FPGA units 450 can access data from the system storage unit 412 through the slice RAM controller 462. The slice RAM controller 462 can use a direct memory access (DMA) engine to directly pull the data from the system RAM to offload any data movement from the processors.

It has been discovered that using the slice RAM controller 462 to directly access the system storage unit 412 improves device programming performance by providing fast access to the slice data 422. Using a dedicated memory controller improves performance by eliminating contention with other devices.

The FPGA physical layer 488 can include a FPGA shared control unit 466. The FPGA shared control unit 466 controls shared resources such as the pass fail LED, adapter power on/off, and other similar resources. The FPGA shared control unit 466 can be coupled to the system control API 464 and the system controller 428. The FPGA shared control unit 466 can receive feedback from the device interfaces 118 and the programmable devices 130 acting as the devices under test 478.

The electrical layer 490 can include hardware for configuring the programmable devices 130. The electrical layer 490 can include the device interfaces 118, the programmer station 116, adapters, and the programmable devices 130 such as the devices under test 478.

Each of the algorithm programming modules 108 of FIG. 1 can be coupled to the FPGA units 450 for configuring the programmable devices 130 with the slice data 422 and the slice metadata 423. The device interfaces 118 can be connected to the FPGA shared control unit 466 to provide feedback and status information back to the system controller 428.

Each of the blocks labeled as DUT 1 to DUT N can include a test device in a socket. Each of the blocks may not be a programmer device with multiple sockets for programming multiple test devices. This would be a double-fan-out of DUT interfaces, as the receiving "programmer" would be required to perform a duplicate fan-out of the DUT interface.

The device programming system 100 can distribute data and command information via a common, high-speed digital bus, such as the data pump 144. The data pump 144 can be used instead of using the DUT interface(s) as that bus. The DUT interface(s) can be a more application specific bus intended for one device and one host, whereas an applicable digital distribution bus is more suited for multi-device communication and can have much higher performance.

The driver layer 484, the FPGA access layer 486, the FPGA physical layer 488, and the electrical layer 490 can be swapped out at run time as the programmable devices 130 are swapped or changed during the operation of the device programming system 100. During the device programming operation, the FPGA units 450 and the new drivers can be reloaded without bringing the device programming system 100 down.

The device programming system 100 can access a subroutine library and retrieve an appropriate driver for each type of the programmable devices 130. The device programming system 100 can subsequently instantiate a thread for each of the driver units for that particular type of device.

Detection of the nonvolatile memory devices, powering up of the nonvolatile memory devices, performing electrical checking to make sure that the power supply is adequate, initializing the devices can be done in a sequence, and checking for security information. When the sequence has been performed for one of the devices, the algorithm for the one of the devices can be kept in a loop waiting for the other algorithms to complete before a direct memory access (DMA) process begins to start the process of programming the devices. The sequence can be performed individually and serially for each of the devices in each of the threads before the bulk data is ready to be sent in parallel.

For the device programming system 100, a memory region 494 is a single contiguous memory space inside one of the programmable devices 130. The memory region 494 can be composed of the slices 136 which can represent the smallest unit of data that the memory region 494 can be configured. For example, the memory region 494 can be analogous to a block, page, or sector in the different flavors of non-volatile memory devices.

When the memory region 494 is created, the operational parameters 44, such as a starting address offset, a blank value, a slice size in bytes, and other parameters can be specified so that the framework can know how to send data to operations attached to the memory region 494. The operations are attached to the memory region 494 to allow the device programmer to act on the memory region 494. When the operations of the memory region 494 are invoked, the framework can supply the slice data 422 that is properly sized and configured for the memory region 494. For example, the slice data 422 can be padded to conform to the slice size with the blank values specified based on the memory region 494.

It has been discovered that the device programming system provides flexibility for supporting different new types of the nonvolatile memory devices by recompiling the system or slice management layer for the new hardware model, recompiling the algorithms, and plugging in the nonvolatile memory devices. The device programming system is then ready for programming the new types of the nonvolatile memory devices. The algorithms are agnostic of the number of the nonvolatile memory devices plugged into the device programming system.

It has also been discovered that the device programming system improves reliability because the FPGA and the new drivers can be reloaded during the operation of the device programming system without bringing the device programming system down.

Figure 5:
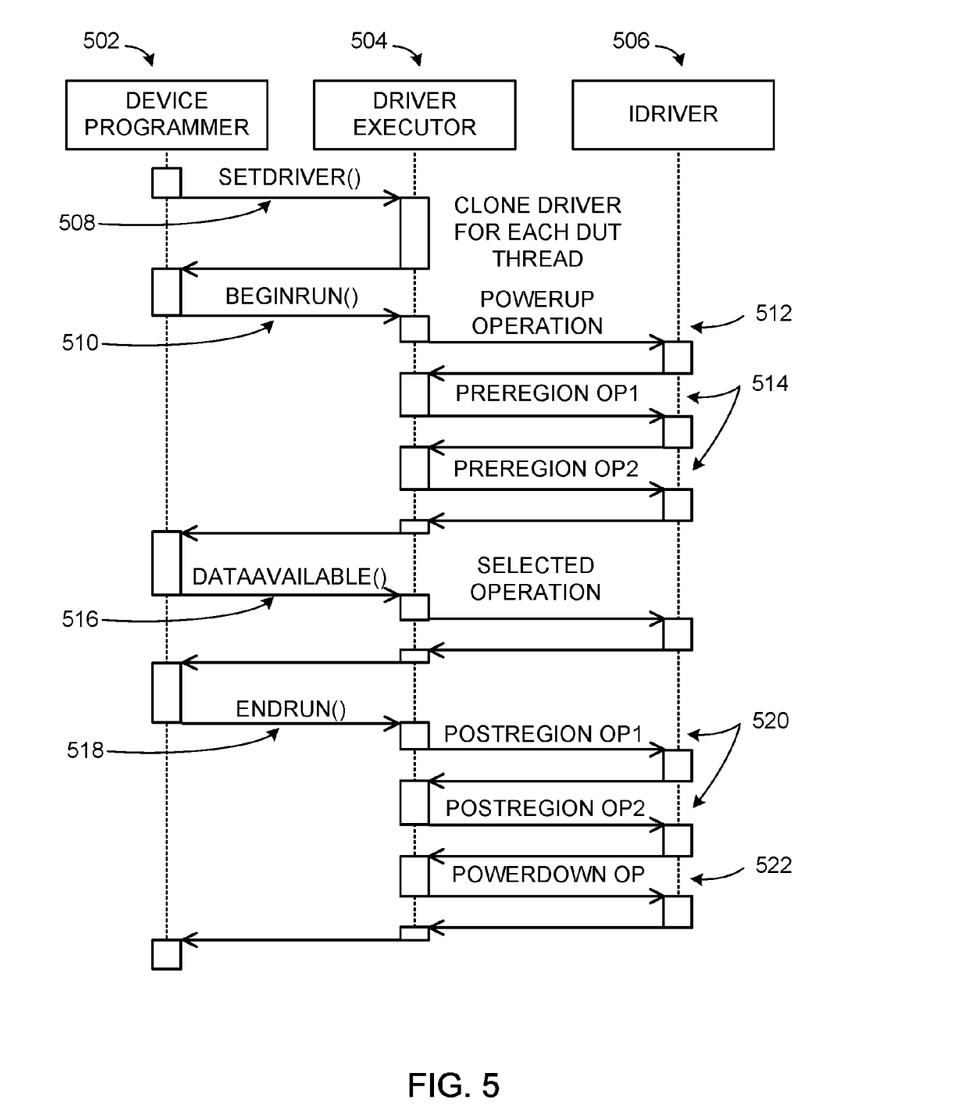
FIG. 5 is an example of a sequence diagram of a driver executor of the device programming system.

Referring now to FIG. 5, therein is shown an example of a sequence diagram of a driver executor of the device programming system 100. The elements of the sequence diagram are exemplary and can be represented by modules, functions, and data elements with similar functions. Although this example provides specific element names, it is understood that this example is representative of the system functionality and can be implemented in a variety of different ways.

The device programming system 100 can include a device programmer module 502, a driver executor module 504, and an idriver module 506. The driver executor module 504 is a class responsible for loading a driver and delivering data to it. The driver executor first employs a Setdriver function 508 to be called to load the driver, which also programs the FPGA, and then a BeginRun function 510 is called to start the system.

When the BeginRun function 510 is called, the driver executor module 504 creates a new thread for each detected DUT it is associated with. It creates a new copy of the specified driver object for each of these threads so that each thread can retain specific state and execution control for its particular DUT. Once these threads and objects are created, it invokes a PowerUp operation 512 and all pre-region operations on each DUT concurrently.

Once all of the DUT threads have completed their pre-region operations, the function returns. At this point a DataAvailable function 516 is called to send data to the memory region operations of the driver. The DataAvailable function 516 needs to be supplied the memory region, operation, and offset along with the actual data that the operation can be consuming.

Once all data has been provided to the driver executor via multiple calls to data available, then an EndRun function 518 is called which runs all post-region operations and the power down operation. If there is any error in the driver during the driver execution, an exception can be generated by the driver, which can be logged and the driver executor can continue to execute the remaining DUTs that are still in a valid state. After the EndRun function 518 is called, the BeginRun function 510 can be immediately be called to start the process again.

The highest level of the device programmer is the IProgrammerService Windows Communication Foundation (WCF) interface. This is a network control layer, which allows outside services to communicate to the device programmer. The interface that is exposed allows an outside service to specify the driver package to be loaded, get system information including current programming statistics, and program devices in the sockets.

A separate User Datagram Protocol (UDP) data channel is used to stream data to the programmer to load the cache with data. The DeviceProgrammer class makes use of a single driver executor for the DUTs in the system and a second one for working with the embedded multi-media card (eMMC) cache.

The Device Driver (IDriver) is described as follows. The FPGA wrapper layer is designed to wrap all DUT specific FPGA functionality into an easy to use API, which can be consumed by Device Drivers. In the case of eMMC, the main FPGA implementation class can be a class designated SdFpgaDesign (IDutFpga). For example, this class can create a VhdlSdApi class (ISdApi) for each DUT found by the hardware discovery.

In this VhdlSdApi class, there are functions, such as SendCommand and BeginWrite. SendCommand sends a command to the current DUT and returns a response. BeginWrite sets up the FPGA write state machine to be ready to receive data after a DMA transaction or EndWrite, which validates that the state machine successfully completed the write transaction and many more, which work with read, verify and power control of the DUT.

The FPGA wrapper can also provide a bit file stream so that the correct FPGA design can be programmed when the driver is loaded. The FPGA wrapper layer is bundled with the driver during driver package creation so that it can be loaded dynamically at runtime along with the driver.

A power-up operation 512 can refer to fundamental system & device initialization. This section is responsible for setting the power supply resources needed power the device. Other operations such as continuity check, hardware configuration checks, versioning checks, and basic device communication/handshaking may also be performed. The general concept is that any operations that are mandatory, regardless of job-configuration, can be performed in this step.

Following power-up, pre-region operations 514 are defined as actions that need to happen prior to bulk broadcast data delivery. Often these actions are dependent on the job-setup, which defines the overall programming task. Pre-region operations may include setting up different, sometimes faster, communication modes with the device, loading specific registers in the device, or sending commands to the device to perform other operations such as:

Erasing the device or portions of the device

Security operations, such as unlock or unprotect encrypted sections.

Read out the electronic ID of the device, and validate it matches an expected value     Configure the device in various modes:

Setup the devices partition-tables or memory map Categorize data received in the subsequent regions operations Configure the run-time behavior of the device The DataAvailable function 516 phase is where the bulk-data is delivered to the devices in parallel via the distributor mechanism. Direction of data may be RAM to Device, such as program or verify, or Device to RAM load/readback. All of the synchronization concepts we discussed come into play during this phase.

Post-region operations 520 are the same concept as pre-region, but tend to cover other operations related to finalizing the process. This often includes setting security attributes on the regions that was just processed or consuming a serial # and applying it to the device, or performing a functional test to validate previous steps.

A power down operation 522 can perform functional actions, but typically it only is involved in shutting down the device's communication channel cleanly (if needed), and powering down the programmers hardware, such as power-supplies and inputs/outputs, so the device can by physically removed from the system.

The device programming system includes modules that perform the functions described above. The modules can interface with each other. The modules can be implemented using a controller that is subsequently described below.

Figure 6:
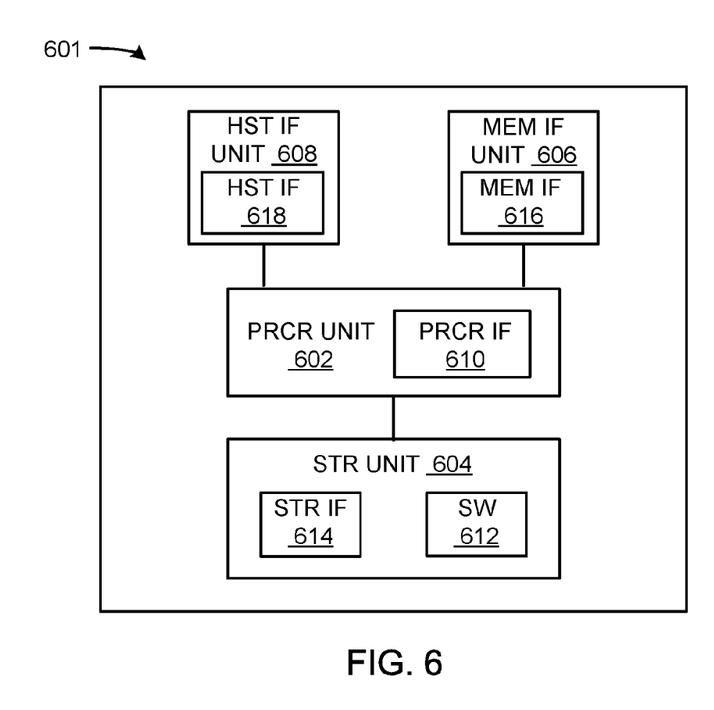
FIG. 6 is an exemplary hardware block diagram of a controller of the device programming system.

Referring now to FIG. 6, therein is shown an exemplary hardware block diagram of a controller of the device programming system 100. For example, a controller device 601 can be employed to implement the algorithms previously described. Also for example, the controller device 601 can be employed to configure or execute any functions of the device programmer module 502 of FIG. 5, the driver executor module 504 of FIG. 5, and the Idriver module 506 of FIG. 5.

The controller can include a control unit 602, a storage unit 604, a memory interface unit 606, and a host interface unit 608. The processor unit 602 can include a processor interface 610. The processor unit 602 can execute a software 612 stored in the storage unit 604 to provide the intelligence of the controller.

The processor unit 602 can be implemented in a number of different manners. For example, the processor unit 602 can be a processor, an embedded processor, a microprocessor, a hardware control logic, a hardware finite state machine (FSM), a digital signal processor (DSP), or a combination thereof The processor interface 610 can be used for communication between the processor unit 602 and other functional units in the controller. The processor interface 610 can also be used for communication that is external to the controller.

The processor interface 610 can receive information from the other functional units or from external sources, or can transmit information to the other functional units or to external destinations. The external sources and the external destinations refer to sources and destinations external to the controller.

The processor interface 610 can be implemented in different ways and can include different implementations depending on which functional units or external units are being interfaced with the processor interface 610. For example, the processor interface 610 can be implemented with a dedicated hardware including an application-specific integrated circuit (ASIC), a configurable hardware including a field-programmable gate array (FPGA), a discrete electronic hardware, or a combination thereof.

The storage unit 604 can include both hardware and the software 612. For example, the software 612 can include control firmware. The storage unit 604 can include a volatile memory, a nonvolatile memory, an internal memory, an external memory, or a combination thereof. For example, the storage unit 604 can be a nonvolatile storage such as non-volatile random access memory (NVRAM), Flash memory, disk storage, or a volatile storage such as static random access memory (SRAM).

The storage unit 604 can include a storage interface 614. The storage interface 614 can also be used for communication that is external to the controller. The storage interface 614 can receive information from the other functional units or from external sources, or can transmit information to the other functional units or to external destinations. The external sources and the external destinations refer to sources and destinations external to the controller.

The storage interface 614 can include different implementations depending on which functional units or external units are being interfaced with the storage unit 604. The storage interface 614 can be implemented with technologies and techniques similar to the implementation of the processor interface 610.

The memory interface unit 606 can enable external communication to and from the controller. For example, the memory interface unit 606 can permit the controller to communicate with the non-volatile memory devices.

The memory interface unit 606 can include a memory interface 616. The memory interface 616 can be used for communication between the memory interface unit 606 and other functional units in the controller. The memory interface 616 can receive information from the other functional units or can transmit information to the other functional units.

The memory interface 616 can include different implementations depending on which functional units are being interfaced with the memory interface unit 606. The memory interface 616 can be implemented with technologies and techniques similar to the implementation of the processor interface 610.

The host interface unit 608 allows the host unit 402 of FIG. 4 to interface and interact with the controller. The host interface unit 608 can include the host interface 618 to provide communication mechanism between the host interface unit 608 and the host unit 402.

The processor unit 602 can operate the host interface unit 608 to send control or status information generated by the controller to the host unit 402. The processor unit 602 can also execute the software 612 for the other functions of the controller. The processor unit 602 can further execute the software 612 for interaction with the non-volatile memory devices via the memory interface unit 606.

The functional units in the controller can work individually and independently of the other functional units. For illustrative purposes, the controller is described by operation of the controller with the host unit 402 and the non-volatile memory devices. It is understood that the controller, the host unit 402, and the non-volatile memory devices can operate any of the modules and functions of the controller.

Figure 7:
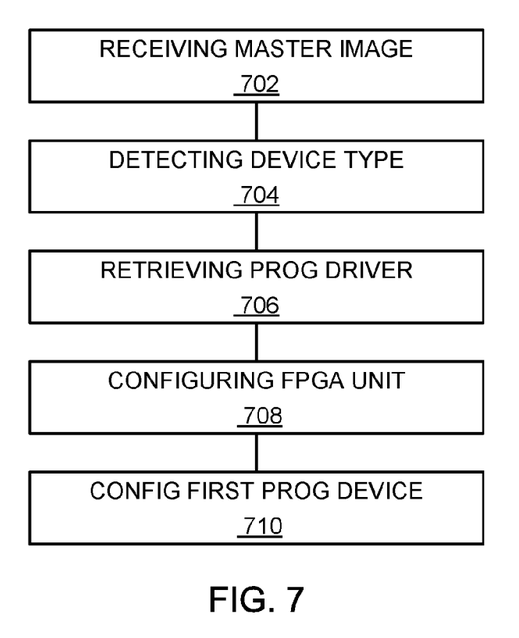
FIG. 7 is a flow chart of a method of operation of a device programming system in a further embodiment of the present invention.

Referring now to FIG. 7, therein is shown a flow chart of a method of operation of a device programming system in a further embodiment of the present invention. The method includes: receiving a master image in a block 702; detecting a device type of a first programmable device in a block 704; retrieving a programming driver based on the device type in a block 706; configuring a field programmable gate array unit using the programming driver in a block 708; and configuring the first programmable device and a second programmable device simultaneously using the master image and the field programmable gate array unit in a block 710.

Thus, it has been discovered that the device programming system of the embodiments of the present invention furnishes important and heretofore unknown and unavailable solutions, capabilities, and functional aspects for the device programming system with multiple-device interface. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing device programming systems fully compatible with conventional manufacturing methods or processes and technologies.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A device programming system comprising:
    a field programmable gate array unit configured using a programming driver retrieved based on a device type of a first programmable device; and
    wherein a second programmable device and the first programmable device are configured simultaneously using a master image and the field programmable gate array unit.

2. The system as claimed in claim 1 further comprising:
    a plurality of algorithm programming modules executing in independent parallel processing threads; and
    wherein:
    the first programmable device having the device type determined in one of the independent parallel processing threads.

3. The system as claimed in claim 1 further comprising:
    a plurality of algorithm programming modules executing in independent parallel processing threads; and
    wherein:
    the first programmable device and the second programmable device are programmed in the independent parallel processing threads.

4. The system as claimed in claim 1 wherein the first programmable device and the second programmable device are configured based on the master image stored in a programmer memory unit.

5. The system as claimed in claim 1 wherein the second programmable device is configured using a second programming driver.

6. The system as claimed in claim 1 wherein the first programmable device and the second programmable device configured using slices of the master image.

7. The system as claimed in claim 6 wherein the master image is partitioned into the slices having a block size based on the first programmable device.

8. The system as claimed in claim 6 wherein the second programmable device has a second device type.

9. The system as claimed in claim 6 further comprising a system storage unit for storing the master image.

10. The system as claimed in claim 6 wherein the second programmable device is configured based on a second device type.

* * * * *